United States Patent [19]
Michaelis

[11] 3,838,834
[45] Oct. 1, 1974

[54] SOLAR TORQUE COMPENSATION FOR A SATELLITE

[75] Inventor: Theodore Donald Michaelis, Big Look Trail, N.J.

[73] Assignee: RCA Corporation, New York, N.Y.

[22] Filed: Dec. 29, 1972

[21] Appl. No.: 319,366

[30] Foreign Application Priority Data
Mar. 20, 1972 Great Britain.................... 12935/72

[52] U.S. Cl.............................................. 244/1 SA
[51] Int. Cl............................................... B64g 1/00
[58] Field of Search...... 244/1 SA, 1 SS, 3.15, 3.21; 136/89; 318/580

[56] References Cited
UNITED STATES PATENTS

| | | | |
|---|---|---|---|
| 3,070,699 | 12/1962 | Lehmann et al.................. | 136/89 X |
| 3,232,561 | 2/1966 | Adams............................. | 244/1 SA |
| 3,304,028 | 2/1967 | Dryden............................ | 244/1 SA |
| 3,326,497 | 6/1967 | Michelson....................... | 244/1 SS |
| 3,367,605 | 2/1968 | Wanger........................... | 244/1 SA |
| 3,390,848 | 7/1968 | Crocker et al.................. | 244/1 SA |
| 3,588,000 | 6/1971 | Buckingham et al............ | 244/1 SA |

Primary Examiner—Trygve M. Blix
Assistant Examiner—Barry L. Kelmachter
Attorney, Agent, or Firm—Edward J. Norton; Joseph D. Lazar

[57] ABSTRACT

A satellite is compensated for torques caused by solar pressure on a solar panel extending from the satellite by an air core coil energized to develop a magnetic torque in opposition to the solar pressure torque. The coil is disposed generally in the periphery of the solar panel mounted externally to the satellite. The energizing current is fixed or varied by ground command or automatically in a closed loop system to compensate for variations in the earth's magnetic field.

3 Claims, 5 Drawing Figures

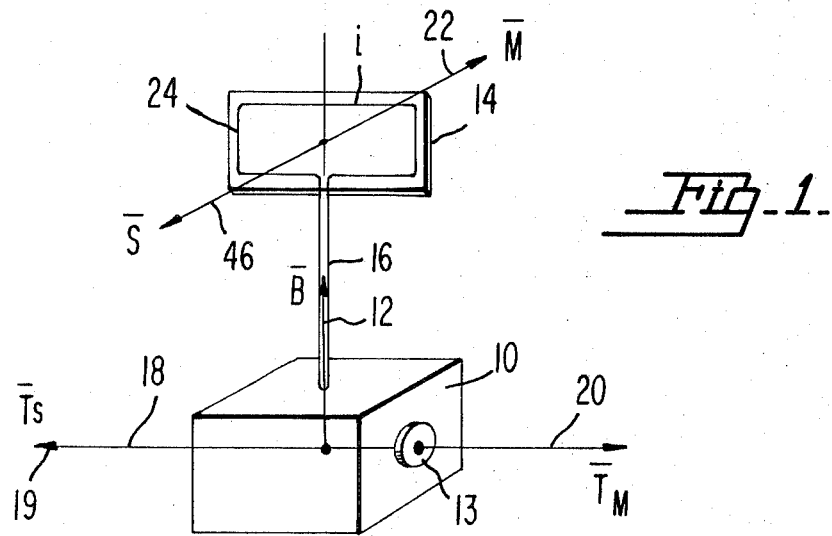
*Fig_1_*
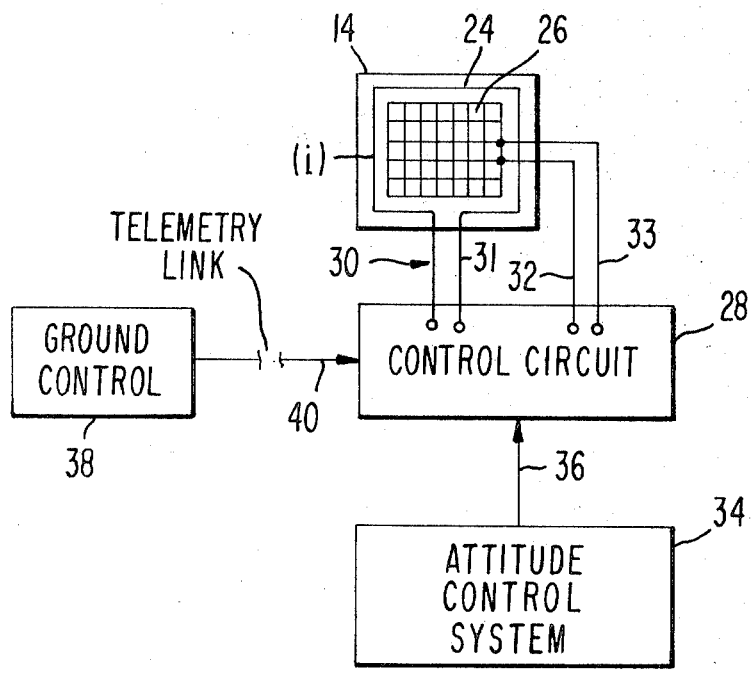
*Fig_2_*

SOLAR TORQUE COMPENSATION FOR A SATELLITE

BACKGROUND OF THE INVENTION

1. Field of the Invention

This invention relates to means for stabilizing a satellite against torques developed by solar pressure on solar panels and more particularly to a magnetic torquing device capable of compensating for the solar pressure torque developed on an asymmetric externally mounted solar panel.

2. Description of the Prior Art

The use of solar panels to convert solar energy into electrical energy on space satellites is well known. The solar pressure acting on the surface of the solar panels creates a torque which, if not balanced, will tend to displace or rotate a satellite from a dynamically stabilized position or orientation. Techniques such as the use of propulsion torquing or magnetic torquing have been used to develop torques to compensate for those created by the solar pressure. Satellites are being required to provide greater numbers of sensors facing earthward and skyward for ecological, surveillance, navigational, and stabilization purposes. These additional sensors place constraints on the organization of a satellite to preclude the use of balanced or symmetrically arranged solar panels. Such balanced arrays are usually in the form of a pair of solar panels extending from the satellite in a symmetrical arrangement. Large satellites requiring large solar-sourced electrical power will need still more solar cells. The use of solar panels that are body-mounted on the surface of the satellite are not adequate. It appears, thus, that only by extending the exposed surface of the solar array can the increased power requirements be met. The constraints of requiring more body-mounted sensor exposure limits the freedom of utilizing symmetrical arrays.

An asymmetrical array, regardless of size, produces a secular momentum accumulation which must be periodically or continuously removed. Providing increased solar energy power while meeting the constraints of more sensors that preclude geometrically symmetrical and balanced solar panels requires a single asymmetrical and thus unbalanced solar panel extending from the satellite in such an orientation as not to interfere with the viewing path of sensors mounted on the spacecraft. To provide such a single panel solar array without extensive alterations in the satellite structure and control system is a problem that exists in the art of attitude control.

SUMMARY OF THE INVENTION

According to the invention the effects of solar pressure developing torques on a satellite having an externally mounted solar panel are compensated by an air core electromagnetic coil disposed in the periphery of the solar panel and energized with a current of appropriate magnitude and polarity to develop a torque that is equal and opposite to the solar pressure torque.

BRIEF DESCRIPTION OF THE DRAWING

FIG. 1 is a schematic diagram showing a satellite with an externally mounted solar panel, and force and torque vectors of a system utilizing the present invention;

FIG. 2 is a schematic of a control system for either a closed-loop system or an open-loop system using ground control;

DESCRIPTION OF A PREFERRED EMBODIMENT

Figure 3:
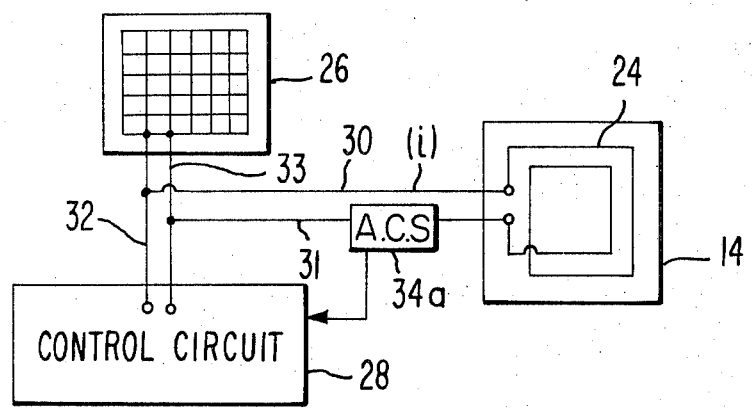
FIG. 3 is a block schematic of a system for energizing the magnetic coil on the solar panel in a parallel relation to the power bus of the satellite.

A satellite embodying the present invention is arranged to be launched from the earth's surface to an orbit which may be either in a synchronous altitude or low inclination orbit. Whether the orbit is synchronous, also termed "geo-stationary," or non-stationary low inclination, the satellite will be passing through the earth's magnetic field such that the earth's field relative to the satellite is an approximately constant south to north vector. The satellite is provided with a single solar panel which is suitably deployed from a stowed position, prior to launch, to an extended position after the orbit has been achieved. The single solar panel upon exposure to the sun converts the solar energy to electrical energy in a manner well known in the art.

The solar energy of the sun causes pressure to be applied on all exposed surfaces of the satellite. The total solar force developed by the unit pressure over the surface area of the solar panel generates a torque about the center of mass of the satellite proportional to the projected area of the solar panel on a plane perpendicular to the sun line and the distance between this force vector and the center mass. The present invention is concerned with this torque. It should be understood, however, the present invention is not concerned with the forces which effect a displacement of the satellite from its orbit. Suitable means such as propulsion devices are used to return a satellite from displaced orbital positions. Such techniques, sometimes termed "station keeping" are well known in the art and form no part of this invention.

According to the present invention such solar pressure generated torques are compensated for by a magnetic torque equal and opposite to the "solar" torque, the magnetic torque being developed by a magnetic flux from an air core coil in the solar panel reacting with the magnetic field of the earth.

A satellite in orbit about the earth is immersed in the earth's magnetic field which extends, generally, from the south to the north pole of the earth. Satellites that are orbiting at synchronous altitudes are generally in a position that is relatively fixed with respect to the earth's surface at a substantially unvarying altitude. The magnetic field of the earth at such synchronous altitudes is approximately a constant. Although the earth's magnetic field is, in general, a constant, a satellite utilizing magnetic torquing means to react with the earth's magnetic field may be provided with means to sense changes in the earth's magnetic field in order to effect the desired torques by electromagnetic torquing techniques. In general, according to the present invention, the magnetic field of the earth is utilized by reacting it with the electromagnetic field of an air core coil in the solar panel to develop a torque needed to compensate for the solar pressure torques.

FIG. 1 illustrates the several torques and forces of concern to an understanding of the present invention shown in relation to a satellite of the type carrying a solar panel or a solar panel array which is asymmetrical relative to the body. The coordinate reference of the torque system is through the composite center of mass 11 of the spacecraft and array, but fixed in inertial space.

The drawing identifies each torque ($\overline{T}$) in accordance with the usual convention in this art wherein the arrow head of the vector defines the torque direction about the axis of the arrow by the "right hand" rule. Thus, the torque vector $\overline{T}_S$, for example, represents a torque acting about axis 18 in a clockwise direction as seen from the center of mass 11 of the spacecraft 10. The torque may also be represented as acting in a direction indicated by the fingers of the right hand grasping axis 18 with the thumb pointing in the direction of the arrow head 19. It is also to be noted, as well known in the art, that a torque can be translated from one axis to another within a rigid system of the type being described with no change in effect.

The spacecraft may be any of the known types that are (1) spin stabilized, (2) stabilized by a despun arrangement utilizing a momentum bias member such as a momentum wheel 13 despun from the body portion, or (3) stabilized by an active three axis zero momentum system.

The present embodiment is described for use in a despun type spacecraft system. The momentum 13 bias member is of relatively lesser mass than the body portion 10 and may carry on it the sensing equipment for attitude control, with a minimum amount of additional apparatus for mission use. It will be understood, however, that the spacecraft configuration may take on any suitable form utilizing the despun principle. Accordingly, a system utilizing the invention may comprise one in which the bias member is the larger mass rotating at a relatively slower speed and the body portion of small mass despun therefrom. The body 10 serves as a platform for those instruments functioning for or requiring geo-stationary orientation, that is, oriented so that its platform is in a fixed orientation relative to the earth, whereby antenna, infrared sensors, telescopes and the like may be mounted and pointed in a stationary, fixed position relative to a chosen site on the earth's surface. Either type of satellite may be placed in a synchronous altitude orbit or in a non-synchronous orbit. The embodiment of the invention to be described is used in a synchronous, i.e., a geo-stationary type of orbiting spacecraft.

It will be understood that the invention can be used in a satellite placed in a non-synchronous low inclination orbit with equal facility, wherein no further modification of the arrangement provided for a synchronous type orbit is required.

Assuming an orientation of the satellite as shown in FIG. 1, the earth's magnetic field lines whose average value is represented by the vector ($\overline{B}$), is parallel with or along axis 12. Solar pressure from the sun along sun line $\overline{S}$ acting on the surface of a solar panel 14 coupled to the satellite by a suitable support member 16 generates a torque represented by the vector ($\overline{T}_S$) about axis 18. The solar panel axis of rotation 16 is approximately parallel to the earth's spin axis when the satellite is orbiting in the earth's equatorial plane. In order to balance the torque $T_S$, an equal and opposite torque, $\overline{T}_M$, acting about axis 20 is required. Torque $\overline{T}_M$, according to the invention, is developed by the interaction of the earth's magnetic field and a magnetic dipole or field ($\overline{M}$) generated at the solar panel. The magnetic dipole $\overline{M}$ directed along axis 46 is normal to the plane of an electrical coil 24 formed in the solar panel, the coil comprising one or more turns of current-carrying wire energized in a manner to be explained. Preferably, the large area of a single panel of a solar array is utilized to produce the required compensation torque with a minimum number of ampere turns.

The interaction of the earth's magnetic field ($\overline{B}$) with the magnetic dipole ($\overline{M}$) will develop a torque $\overline{T}_M$ along axis 20. The interaction of these two fields may be represented by the well known vector relationship:

$$\overline{T}_M = \overline{M} \times \overline{B} \qquad (1)$$

The angle between the earth's magnetic field vector (B) and the magnetic dipole vector (M) can differ from orthogonality by as much as 16° depending on magnetic longitude as well known in the art. However, since the solar array rotates once per day with respect to the earth's field, for a geo-stationary synchronous orbit, the undesired momentum thereby produced averages to zero on a daily basis. Therefore no special control is required beyond a small cyclic momentum storage capability to contend with a misalignment of the B and M flux field. Such momentum storage techniques are well known in the art.

The solar torque effect ($T_S$) is compensated for by magnetic torque ($T_M$), in an open or closed-loop control system. The spacecraft 10 is provided with single solar panel 14 attached to the spacecraft by suitable structurally deployable and rotatable means 16 within which are carried the required electrical conductors. The solar panel 14 is rotated relative to the spacecraft 10 by shaft 16 by a suitable solar panel drive mechanism, not shown, to control the orientation of the panel so that the plane carrying the solar cells faces the sun throughout the orbit period, even during a solar eclipse. Any known mechanism or system may be used to achieve such orientation as exemplified by U.S. Pat. No. 3,620,846 issued on Nov. 16, 1972, and No. 3,304,028 issued on Feb. 14, 1967. Electrical coil 24 formed of one or more turns of electrically conductive material, such as aluminum or copper, is formed in the peripheral portion of the solar panel 14. Coil 24 may be integrally formed within the structure of solar panel 14 or it may be suitably attached on one or the other faces of the solar panel. Electrical conductors and controls are provided to energize the coil 24 as will be further described. In general, coil 24 is energized with an electrical DC current ($i$) in the direction or polarity required to develop the magnetic dipole $\overline{M}$ in the direction indicated. The magnetic dipole $\overline{M}$ reacts with the earth's magnetic field $\overline{B}$ to generate the torque $\overline{T}_M$ as previously described. The torque vector $\overline{T}_M$ is proportional to the current ($i$) flowing through coil 24. The magnetic torque $\overline{T}_M$ is arranged to be equal and opposite to the solar torque $\overline{T}_S$ by providing the required current ($i$) through coil 24. The magnetic torque is proportional to the area, the number of turns, and the current flowing through the coil. The current ($i$) is controlled to the required amplitude by suitable controls such as a modulator or current regulator. The magnitude of the earth's magnetic field, $\overline{B}$, varies occasionally due to magnetic "storms." The current ($i$) may be controlled in an open loop from the ground, or closed loop utilizing suitable magnetometer sensing techniques to compensate for variations in the earth's magnetic field.

Referring to FIG. 2 an exemplification of a suitable control system is illustrated in block diagram form. The solar panel 14 carries coil 24 and an array of solar cells 26 which are connected to a suitable control circuit 28 by conductor leads 30, 31, 32, and 33, respectively. An attitude control system 34 is suitably coupled to control circuit 28 as by control path 36 to provide means to effect control of current ($i$) required to energize the coil 24. For systems utilizing ground command of the coil torquing current ($i$), a ground control system 38 transmits commands over radio link 40 to control circuit 28. Both the ground control system and the automatic attitude control system may be operated concurrently if desired as known in the art. The control circuit 28 includes means to energize the electromagnetic coil such as suitable current control devices and the satellite's power supply bus and batteries. The attitude control system includes the usual means for sensing the attitude of the satellite using horizon sensors, star sensors, or gyroscopic sensing devices, and means for generating error correction control commands which are conducted to the control circuit over path 36. Reference is made to "Space Communication Systems," by Filipowsky and Muehldorf, Prentice Hall, 1965, for a description of attitude control system including sensors used in such systems. Reference is also made to U.S. Pat. No. 3,232,461 and copending application, Ser. No. 238,483, filed Mar. 27, 1972 entitled "Closed Loop Roll and Yaw Control for Satellites," assigned to the same assignee as the present application.

Thus, the attitude control system 34 and control circuit 28 are suitably arranged to alter the current ($i$) applied to the coil 24 to compensate for any changes in the earth's magnetic field that occurs. Such changes in field can be sensed either by a magnetometer or by the change in attitude of the satellite 10. The manner in which such controls is effected is well known in the servo control art as applied to attitude control systems for satellites and forms no part of the present invention. The design and implementation of the various devices and elements needed to practice the invention are considered to be within the skill of the art.

In operation, the solar cell array 26 when exposed to the sun generates electrical energy which is conducted to the control circuit over conductors 32 and 33. The current may be applied directly through suitable switching controls to coil 24 to develop a torque $T_M$ to balance torque $T_S$ effected by the impingement on the solar panel of the source energy. As the sun is occluded by the earth, the solar torque will vanish thereby eliminating the need for providing a compensation torque. Since the solar array current also vanishes when the sun is occluded, the magnetic torque will also become zero.

As explained above, the invention may be implemented for a satellite or spacecraft with an automatic (closed-loop) control system or an open-loop control requiring control commands from ground-situated personnel. The ground personnel upon determining by telemetric signals of attitude error or earth's magnetic field changes indicating that the satellite solar panel coil requires adjustment, will direct control signals to the satellite equipment to provide the required adjustments in coil current.

One arrangement for energizing the torquing coil 24 according to the invention is illustrated in FIG. 3. This arrangement provides a means for adjusting the torquing coil current within a partial or full-shunt regulator satellite power system. The coil current ($i$) is provided either in an on-off mode or continuously. The attitude control system (A.C.S.) 34$a$ typically may comprise reaction wheels, gyros, an earth horizon sensor, and a star sensor. In the arrangement of FIG. 3, the solar array panel 26 is coupled to control circuit 28 through array bus leads 32 and 33. The solar cells 26 and torquing coil 24 are shown separately for convenience, noting that they are both common to the panel 14 as shown in FIGS. 1 and 2. In parallel or shunt arrangement with those bus leads, torquing coil 24 is connected through suitable means included, for example, in an attitude control system 34$a$ in conductor path 31. In operation, the current generated by solar array 26 is applied both to the control circuit 28 of the satellite 10 as well as to the solar panel torquing coil 24. The attitude control system 34$a$ and control circuit 28 are arranged suitable to effect changes in the current in coil 24 to develop the necessary counter torque $\overline{T}_M$ to offset or compensate for the solar pressure torque $\overline{T}_S$.

Figure 4:
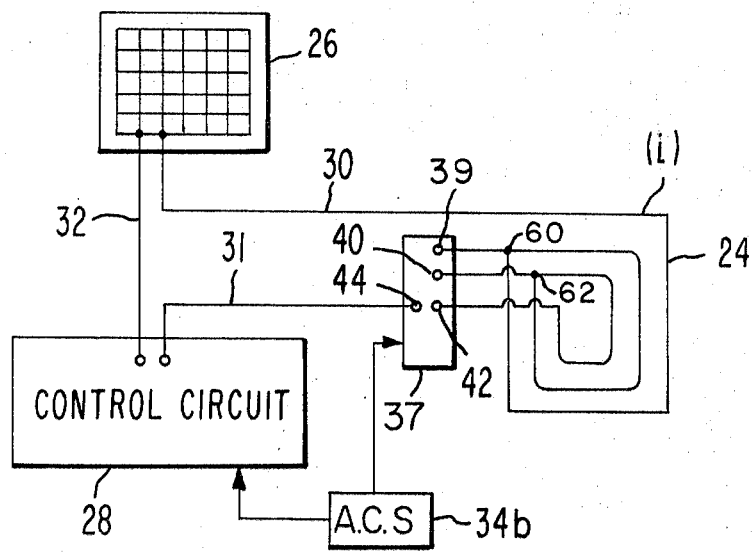
FIG. 4 is a diagram of a modification of the schematic of FIG. 3, for a system for energizing the coil in series with the power bus.

FIG. 4 illustrates an arrangement for providing current to torquing coil 24 in series with a power system of a satellite in which the array current ($i$) is nominally or substantially constant. The effective number of turns of torquing coil 24 is changed by a switching circuit 36 to provide an automatic control of the time-averaged dipole strength M required to generate the counter torque $T_M$.

In the arrangement shown in FIG. 4 one supply lead 30 of the solar array 26 is connected to the first turn of a plural-winding torquing coil 24. The tap 60 for the first turn is connected to a suitable switch 37 at terminal 39. The top 62 for the second turn of the torquing coil is connected to terminal 40 and the third turn is connected to terminal 42. The attitude control system (A.C.S.) 34$b$ or ground command 38 (such as shown in FIG. 2) are arranged to provide control signals to the switch 37 to select one of the several windings of the torquing coil 24 required for connection to the control circuit 28 over lead 31 through terminal 44. In operation, as the torquing requirements are changed due to a change in magnetic flux of the earth, the attitude control system 34$b$ will automatically control the time average ampere turns.

Thus, for a system in which either or both a variable or fixed solar array current is provided from the array bus, a high impedance torquing coil may be utilized in shunt relation with the array bus as shown in FIG. 3. The arrangement illustrated in FIG. 4 is useful for a system in which the array bus provides only a fixed current as used in communication type satellites of the geostationary type. This arrangement generally requires less complex systems to implement as compared to the modulator arrangement and torquing coil of FIG. 3 which requires more coil turns in order to provide the torquing required. With the arrangement of FIG. 4 in general, fewer turns for the torquing current is required even though a switching arrangement for tapping turns from such a coil is needed for the fixed current.

Figure 5:
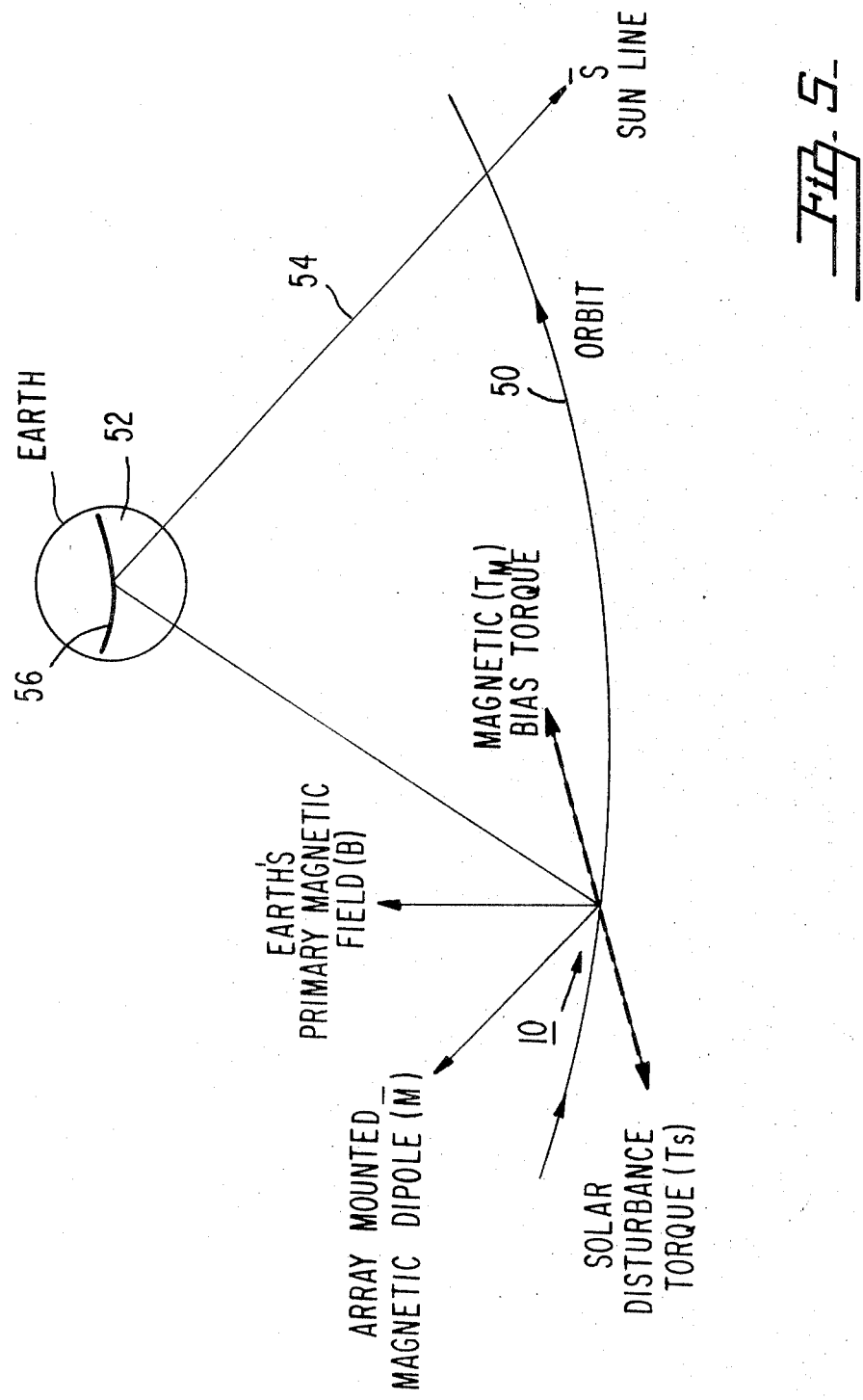
FIG. 5 is a diagram of an orbiting satellite showing the vector relationships concerned with the mechanical controls relating to the invention.

The diagram illustrated in FIG. 5 shows in another form the vector relationships of the various forces and torques that are of concern to a satellite utilizing the invention. The diagram illustrates the satellite 10 in an orbit 50 about the earth 52. The orbit is approximately equatorial. The solar panel of the satellite is oriented to face towards the sun parallel to the sun line vector 54. The solar disturbance torque, $T_S$, is compensated for by the magnetic bias torque $\bar{T}_M$ which is generated by the interaction of the array mounted magnetic dipole ($\bar{M}$) with the earth's magnetic field $\bar{B}$.

It is thus to be now appreciated, according to the invention, a spacecraft provided with a solar panel may be utilized in equatorial geo-stationary orbits in which the solar panel axis of rotation is approximately parallel to the spin axis of the earth. Such an arrangement provides for an inexpensive and structurally light means for developing the necessary compensation for the torque developed by solar pressure on systems requiring an asymmetrical solar panel array.

What is claimed is:

1. An attitude control system for a spin stabilized spacecraft to compensate for torques due to solar pressure, said spacecraft having a panel with a set of solar cells adapted to receive solar radiant energy for conversion to electrical power, said panel being arranged for deployment from the spacecraft including means for orienting the panel toward the sun, the improvement comprising:
    a. electromagnetic means included in said panel for generating a magnetic flux having a magnetic field extending normal to the plane of said panel for reacting with the magnetic field of the earth, said electromagnetic means comprising a single electromagnetic air core coil having at least one turn of wire disposed in the peripheral portion of said solar cell panel, and in a plane parallel with the plane of said solar panel, and
    b. means for energizing said electromagnetic means in response to solar energy received on said solar panel such that a magnetic flux therefrom reacts with the magnetic field of the earth to produce a magnetic torque substantially of equal magnitude and opposite direction to the torque developed on said spacecraft by the solar pressure of the solar radiant energy on said panel.

2. A system according to claim 1 wherein said energizing means includes means for connecting said solar cells and said coil in parallel.

3. A system according to claim 1 wherein said energizing means includes means for connecting said solar cells and said coil in series.

* * * * *